United States Patent
Aoki et al.

(10) Patent No.: US 6,549,328 B2
(45) Date of Patent: Apr. 15, 2003

(54) ACOUSTO-OPTIC TUNABLE FILTER

(75) Inventors: Shinichi Aoki, Kawasaki (JP); Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/098,497

(22) Filed: Mar. 18, 2002

(65) Prior Publication Data

US 2003/0035200 A1 Feb. 20, 2003

(30) Foreign Application Priority Data

Aug. 14, 2001 (JP) ........................................ 2001-246259

(51) Int. Cl.$^7$ ............................. G02F 1/33; H04J 14/02; G01J 3/00
(52) U.S. Cl. .................... 359/308; 359/124; 359/127; 359/305; 356/300
(58) Field of Search ................................ 359/305, 308, 359/310, 312, 278, 285, 124, 127; 356/300; 250/338.5, 339.12, 339.07, 343

(56) References Cited

U.S. PATENT DOCUMENTS 6,411,411 B1 * 6/2002 Okazaki et al. .............. 359/127

FOREIGN PATENT DOCUMENTS

| JP | 08-114776 | 5/1996 |
| JP | 10-260380 | 9/1998 |

OTHER PUBLICATIONS

Janet L. Jackel, et al., "A Passband–Flattened Acousto Filter", IEEE Photonics Technology Letters, vol. 7, No. 3, Mar. 1995, PP318–PP320.

* cited by examiner

Primary Examiner—Loha Ben
Assistant Examiner—William Choi
(74) Attorney, Agent, or Firm—Staas & Halsey LLP

(57) ABSTRACT

An object of the invention is to provide an acousto-optic tunable filter (AOTF) that realizes filter characteristics where the wavelength characteristics in the vicinity of a selected center wavelength are smooth, and the bandwidth thereof is sufficiently narrow. To this end, an AOTF of the invention has a construction where a mode coupling section and a wavelength characteristic flattening section provided with an optical filter configuration for selecting an optical signal based on mode conversion using the acousto-optic effect, are respectively connected via a mode branching device. The mode coupling section mode converts an optical signal corresponding to a selected wavelength, and the wavelength characteristic flattening section again mode converts only the optical component of a part of the selected optical signal mode converted in the mode coupling section in the vicinity of a center wavelength thereof. The optical component that has not been subjected to second mode conversion in the wavelength characteristic flattening section is branched and output by a mode branching device connected to the output side of the wavelength characteristic flattening section, to thereby perform flattening of the wavelength characteristics of the selected optical signal in the vicinity of the center wavelength.

14 Claims, 10 Drawing Sheets

(A)

(B)

(A)

(B)

(C)

(D)

US 6,549,328 B2

ACOUSTO-OPTIC TUNABLE FILTER

BACKGROUND OF THE INVENTION

(1) Field of the Invention

The present invention relates to an acousto-optic tunable filter capable of varying a selected wavelength, that performs selection of optical signals based on mode conversion using the acousto-optic effect, and in particular, relates to an acousto-optic tunable filter that achieves the flattening of filter characteristics.

(2) Related Art

For example, in wavelength division multiplexed (WDM) optical communications, in order to add or drop an optical signal of a required wavelength to or from a WDM signal light being propagated through an optical transmission path or the like, an optical add/drop device is used. For this optical add/drop device, there is known for example one which uses an arrayed waveguide grating (hereunder AWG), or one which uses an acousto-optic tunable filter (hereunder AOTF).

The conventional optical add/drop device using an AWG is basically of a fixed wavelength type configuration in which the wavelength of the optical signal to be added or dropped cannot be freely selected. Hence, this is only applicable to fixed networks, and is difficult to be applied to networks where expansion or modification of the optical line is frequently carried out. Therefore, there is also proposed an optical add/drop device where the wavelength is selectable by combining an AWG and an optical switch. However, in such an optical add/drop device where an AWG and an optical switch are combined, there is the disadvantage in that construction becomes complex resulting in higher cost.

On the other hand, in the conventional optical add/drop device using the AOTF, the construction is simple giving a low cost. This AOTF has the advantage in that for example an optical signal of a 1.5 $\mu$m band can be selected based on the application of an electrical signal of 170 MHz band, and moreover, by applying an electrical signal of a plurality of frequencies at once, optical signals of a plurality of wavelengths can be simultaneously selected.

However, in the conventional optical add/drop device using the AOTF, there is a problem attributable to the filter characteristics of the AOTF. That is, considering a case where an optical signal of a required wavelength is selected to be branched from an input light by an optical branching device that uses the AOTF shown in (A) of FIG. 17, the typical AOTF has filter characteristics in that, in the vicinity of a wavelength which coincides with a wavelength of optical signal to be selected (hereunder the selected center wavelength), the branching characteristic (the transmissivity of the branched light) relative to the wavelength is changed steeply as shown in (B) of FIG. 17. On the other hand, for the optical signals of respective wavelengths included in the input light to the AOTF, as shown in (C) of FIG. 17, the spectra thereof spread slightly from the center wavelength due for example to an influence of modulation. Therefore, in the spectrum of the optical signal branched by the AOTF, as shown in (D) of FIG. 17, the light power drops on the short wavelength side and the long wavelength side of the center wavelength. In optical transmission systems constructed using an optical branching device having such a characteristic, there is a problem of the likelihood of an increase in line errors and the like.

To solve the problem attributable to the above AOTF filter characteristics, there is proposed in the article a technique for flattening the AOTF filter characteristics; Janet L. Jackel et al., "A Passband-flattened Acousto-optic Filter", IEEE Photonics Technology Letters, Vol. 7 No. 3, pp 318–320 1995. In the technique described in this article, for a directional coupling type AOTF, in intensity function of a surface acoustic wave (hereunder SAW) capable of flattening the filter characteristics is predicted based on an approximation by combining two half-period sine waves, and a SAW drive method is proposed in accordance with this intensity function.

However, in the above-mentioned conventional technique, there is a disadvantage in that the width of wavelength band to be flattened is comparatively wide. More specifically, it is reported that the band width flattened to a fluctuation amount of 0.5 dB or less becomes around 1 nm. In recent WDM optical communications, however, technological development is advancing for wavelength division multiplexing optical signals at wave length intervals of for example 0.8 nm (100 GHz) or 0.4 nm (50 GHz), to transmit the thus wavelength division multiplexed light. For a WDM signal light of such narrow wavelength intervals, it is difficult to construct an optical add/drop device or the like by applying the conventional AOTF having such a wide bandwidth.

Furthermore, in the conventional AOTF, in order to realize a SAW in accordance with an intensity function capable of flattening the filter characteristics, a SAW generated from a single electrode must be propagated over a long distance along an optical waveguide. Hence there is also the disadvantage in that the overall length of the AOTF becomes long.

SUMMARY OF THE INVENTION

The present invention has been achieved in view of the above mentioned problems, and it is an object of the present invention to provide an acousto-optic tunable filter that realizes filter characteristics where the wavelength characteristics in the vicinity of selected center wavelength are flat, and the bandwidth of the selected wavelength is sufficiently narrow.

In order to achieve the above object, an AOTF of the present invention is constituted such that a plurality of areas each provided with an optical filter configuration capable of varying a selected wavelength, for performing selection of optical signals based on mode conversion using the acousto-optic effect, are respectively connected via a mode branching device, wherein at least one area of the plurality of areas functions as a mode coupling section that mode converts an optical signal corresponding to the selected wavelength, and at least one of other areas functions as a wavelength characteristic flattening section that again mode converts only the optical component of a part of the selected optical signal mode converted by the mode coupling section in the vicinity of a center wavelength thereof. Then, the mode branching device connected to an output side of the wavelength characteristic flattening section, branches the selected optical signal except for the optical component mode converted by the wavelength characteristic flattening section, to output the branched selected optical signal, to thereby perform flattening of the wavelength characteristics in the vicinity of the center wavelength of the selected optical signal.

In the AOTF of such a configuration, input optical signals are sent to the mode coupling section, wherein the optical signal corresponding to the selected wavelength is converted from a TE mode into a TM mode (or from the TM mode into the TE mode), and an output light of the mode coupling section passes through the mode branching device at a latter stage, so that the mode converted optical signal is branched, to be sent to the wavelength characteristic flattening section as the selected optical signal. In the wavelength characteristic flattening section, only the optical component of a part of the selected optical signal in the vicinity of the center wavelength thereof is again converted from the TM mode into the TE mode (or from the TE mode into the TM mode), and the output light of the wavelength characteristic flattening section passes through the mode branching device at the latter stage, so that the optical component that has not been subjected to second mode conversion in the wavelength characteristic flattening section is branched, and the selected optical signal of which light power in vicinity of the center wavelength has been flattened is output.

Moreover, as one aspect of the AOTF, the configuration may be such that the mode coupling section propagates therethrough a surface acoustic wave having a frequency corresponding to the selected wavelength and having the intensity capable of mode converting the optical signal corresponding to the frequency, along an optical waveguide, and also, the wavelength characteristic flattening section propagates therethrough a surface acoustic wave having a frequency corresponding to the selected wavelength and having the intensity smaller than the intensity of the surface acoustic wave propagated within said mode coupling section, along the optical waveguide.

With the AOTF of such a configuration, in the wavelength characteristic flattening section, flattening of the selected optical signal is performed in the vicinity of the center wavelength, by applying the surface acoustic wave with the intensity smaller than that of the surface acoustic wave applied at the mode coupling section.

Furthermore, as a specific configuration of the AOTF, the mode coupling section and the wavelength characteristic flattening section each may have an electrode that generates the surface acoustic wave by applying an electrical signal, a guide that propagates the surface acoustic wave from said electrode along the optical waveguide, and an absorber that absorbs to terminate the surface acoustic wave being propagated through the guide. With such a configuration, in the respective electrodes of the mode coupling section and the wavelength characteristic flattening section, surface acoustic waves of which frequencies are the same but intensities are different, are respectively generated, and the surface acoustic waves pass through the guides to be propagated to the absorbers, respectively.

Alternatively, the mode coupling section may have an electrode that generates the surface acoustic wave by applying an electrical signal, a guide that propagates the surface acoustic wave from the electrode along the optical waveguide, and an absorber that attenuates the surface acoustic wave being propagated through the guide, and then transmit the attenuated surface acoustic wave to the wavelength characteristic flattening section. The wavelength characteristic flattening section may have a guide that propagates the attenuated surface acoustic wave transmitted from the absorber of the mode coupling section along the optical waveguide, and an absorber that absorbs to terminate the surface acoustic wave being propagated through the guide. With such a configuration, the surface acoustic wave generated by the electrode of the mode coupling section passes through the guide to be propagated to the absorber, and then the surface acoustic wave that has passed through the absorber to be attenuated to the required intensity passes through the guide of the wavelength characteristic flattening section to be propagated to the absorber. According to this configuration, it is not necessary to provide the electrode for generating the surface acoustic wave in the wavelength characteristic flattening section, and hence simplification of the construction can be achieved.

Furthermore, as another aspect of the aforementioned AOTF, the mode coupling section may be constituted such that the surface acoustic wave having the frequency corresponding to the selected wavelength is propagated, along the optical waveguide over a predetermined interference length capable of mode converting the optical signal corresponding to the frequency. And the wavelength characteristic flattening section may be constituted such that the surface acoustic wave having the frequency corresponding to the selected wavelength is propagated, along the optical waveguide over an interference length different to the predetermined interference length.

In the AOTF of this configuration, the flattening of the selected optical signal in the vicinity of the center wavelength thereof is performed by setting the interference length of the optical signal and the surface acoustic wave in the wavelength characteristic flattening section to be shifted from an optimum interference length capable of mode converting all the components of the selected optical signal. As a result, the same surface acoustic waves can be applied to the mode coupling section and the wavelength characteristic flattening section, and hence adjustment of the surface acoustic wave for each section is practically unnecessary.

Other objects, characteristics and advantages of the present invention will become apparent from the following description of embodiments, in association with the appended drawings.

DETAILED DESCRIPTION OF THE INVENTION

Hereunder is a description of embodiments of the present invention, based on the drawings. In the respective drawings, similar construction is denoted by the same reference symbols, and description thereof is omitted.

Figure 1:
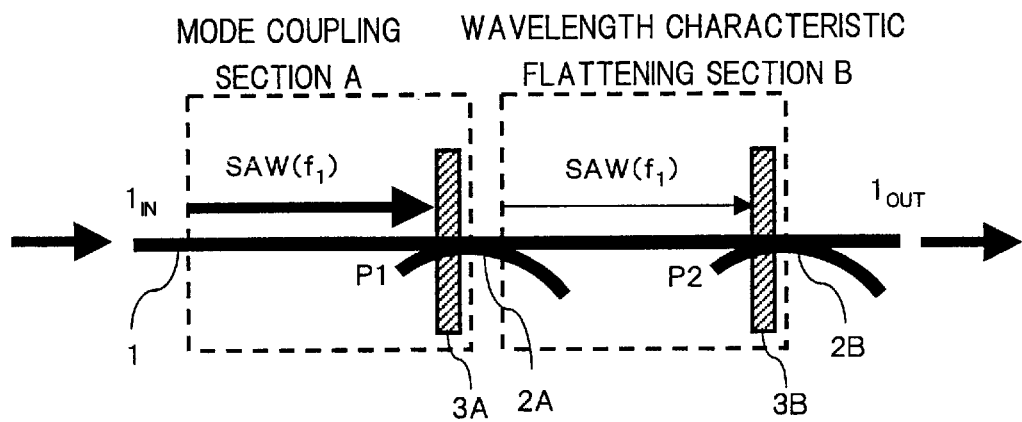
FIG. 1 is a plan view showing a first basic configuration of an AOTF according to the present invention.
Figure 2:
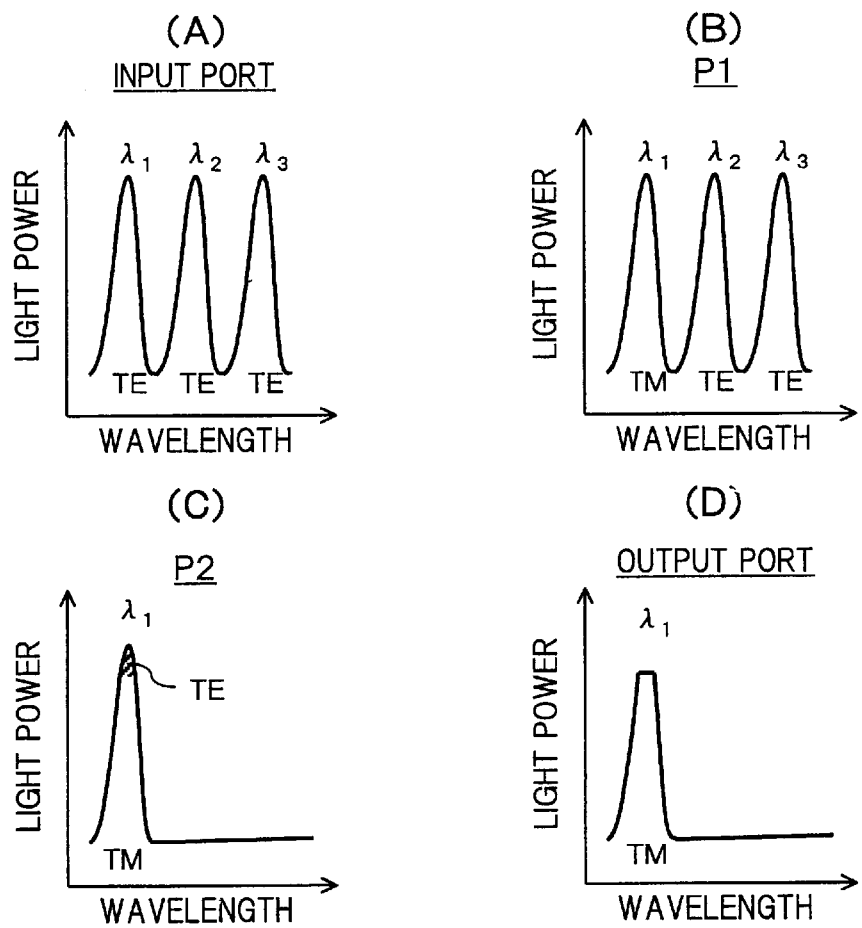
FIG. 2 is a diagram illustrating light powers and polarization modes relative to wavelengths at respective points of the AOTF of FIG. 1.

FIG. 1 is a plan view showing a first basic configuration of an acousto-optic tunable filter (AOTF) according to the present invention. Moreover, FIG. 2 is a diagram illustrating light powers and polarization modes corresponding to wavelengths at respective points of the AOTF of FIG. 1.

In FIG. 1, in the AOTF of the first basic configuration, for example, a mode coupling section A and a wavelength characteristic flattening section B each having an optical filter construction capable of varying a selected wavelength utilizing the acousto-optic effect, are sequentially arranged on an optical waveguide 1 formed on a substrate S along a propagation direction of light, and a mode branching device 2A is inserted between the mode coupling section A and the wavelength characteristic flattening section B, and a mode branching device 2B is inserted onto the latter stage of the wavelength characteristic flattening section B.

The optical waveguide 1 has at opposite ends thereof, an input port $1_{IN}$ and an output port $1_{OUT}$. To the optical waveguide 1, TE mode or TM mode optical signals are input to the input port $1_{IN}$ and a selected light output from the mode branching device 2B is output from the output port $1_{OUT}$. Here, as shown for example in (A) of FIG. 2, a TE mode WDM signal light including optical signals of wavelengths $\lambda_1$, $\lambda_2$ and $\lambda_3$ is input to the input port $1_{IN}$.

The input light to the optical waveguide 1 is not limited to the above, and optical signals of wavelengths in arbitrary numbers with aligned polarization modes thereof can be made an input light. Furthermore, if a mode branching device (not shown in the figure) is inserted between the input port $1_{IN}$ and the mode coupling section A, then an AOTF independent of the polarization condition of the input light is also possible.

In the mode coupling section A, a surface acoustic wave (SAW) having a frequency corresponding to the center wavelength of the optical signal to be selected (selected center wavelength) is propagated along the optical waveguide 1 on the substrate S, to a SAW absorber 3A, so that only the optical signal of a wavelength corresponding to the frequency of the SAW is mode converted. Here, the SAW absorber 3A has a characteristic where the propagated SAW is almost completely absorbed and is essentially not transmitted to the latter stage. A specific configuration of the mode coupling section A is described later.

In the wavelength characteristic flattening section B, a SAW having a frequency corresponding to the selected center wavelength, and the intensity thereof sufficiently smaller compared to that of the SAW supplied by the mode coupling section A, is propagated along the optical waveguide 1 on the substrate S, to a SAW absorber 3B, so that a part of the optical signal of a wavelength corresponding to the frequency of this SAW is mode converted in accordance with the intensity of the SAW. In FIG. 1, the intensity of the SAW is represented according to the thickness of the arrow line. The SAW absorber 3B absorbs practically all of the propagated SAW. A specific configuration of this wavelength characteristic flattening section B is also described later.

The mode branching device 2A here branches only the component of TM mode out of the optical signal which has passed through the mode coupling section A, to send this to the wavelength characteristic flattening section B. Furthermore, the mode branching device 2B here branches only the component of TM mode out of the optical signal having passed through the wavelength characteristic flattening section B, to send this to the output port $1_{OUT}$. For each of the mode branching devices 2A and 2B, for example, a polarization beam splitter (hereunder PBS) or the like can be used.

Figure 3:
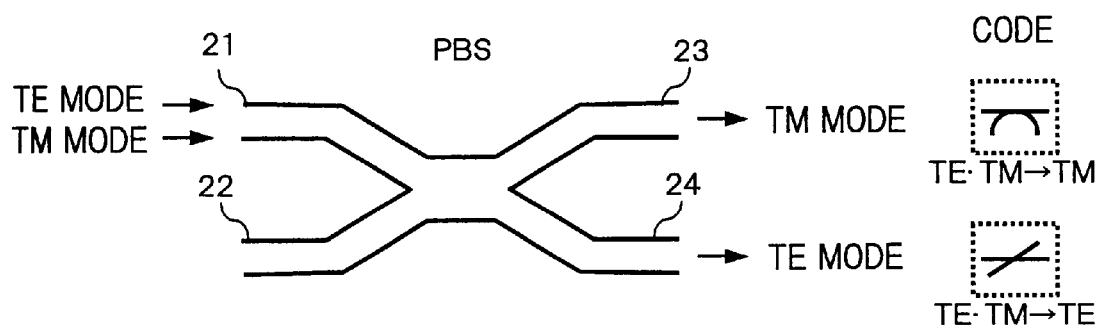
FIG. 3 is a plan view schematically showing one example of a PBS usable as a mode branching device of the AOTF according to the present invention.
Figure 3:
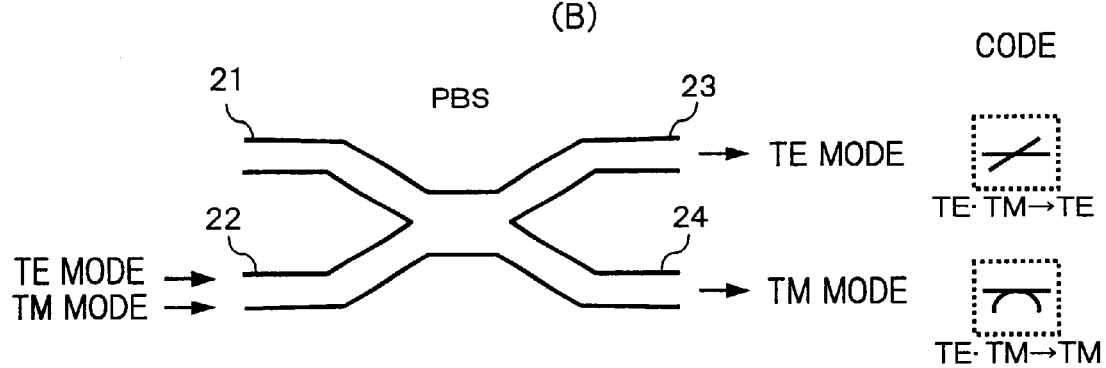

FIG. 3 is a plan view schematically showing one example of a typical PBS capable to be used as the mode branching devices 2A and 2B.

The PBS of FIG. 3 has for example two input ports 21 and 22 and two output ports 23 and 24. In (A) of FIG. 3, the output condition is shown for when optical signals of TE mode and TM mode are input to one input port 21, while in (B) of FIG. 3, the output condition is shown for when optical signals of each mode are input to the other input port 22. In this PBS, the TE mode optical signal input to either of the input ports is output from the output port positioned on a different side to the input port (crossing side), and the TM mode optical signal is output from the output port positioned on the same side as the input port (bar side). Consequently, in a case where the PBS of FIG. 3 is used for the aforementioned mode branching device that selects only the TM mode from the input light, to output the selected TM mode optical signal as shown in FIG. 1, the input port 21 and the output port 23 (or the input port 22 and the output port 24) may be respectively connected to the optical waveguide 1. On the other hand, in a case where the PBS is used as a mode branching device that selects only the TE mode from the input light, to output the selected TE optical signal, the input port 21 and the output port 24 (or the input port 22 and the output port 23) may be respectively connected to the optical waveguide 1. Here, in order to discriminate between the mode branching device that selects the TM mode and the mode branching device that selects the TE mode, codes such as shown on the right side of FIG. 3 are used.

Figure 17:
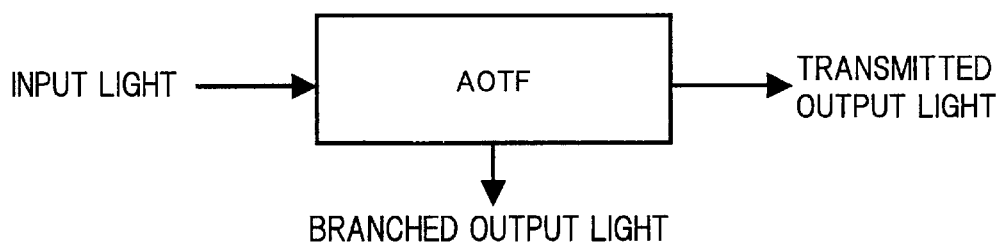
FIG. 17 is a diagram for explaining problems of a conventional AOTF, respectively showing; (A) a configuration of an optical branching device using an AOTF, (B) filter characteristics of a conventional AOTF, (C) spectrum of an input optical signal and (D) spectrum of an optical signal branched by a conventional AOTF.
Figure 17:
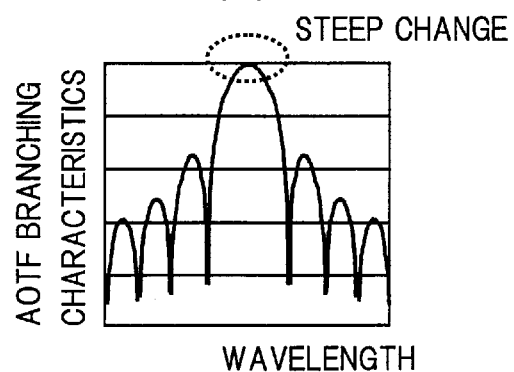
Figure 17:
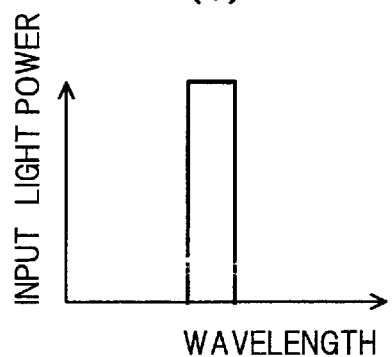
Figure 17:
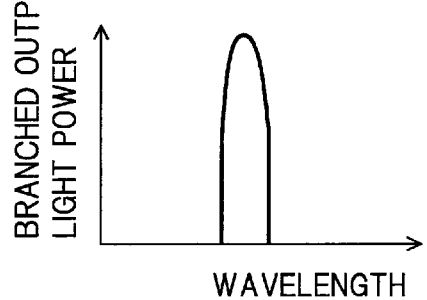

In the AOTF having the above-described first basic configuration, as shown in (A) of FIG. 2, when a TE mode WDM signal light including the optical signals of wavelengths $\lambda_1$, to $\lambda_3$ is input to the input port $1_{IN}$, this WDM signal light is propagated through the optical waveguide 1 to be sent to the mode coupling section A. At the mode coupling section A, for example, in a case where the wavelength $\lambda_1$ is set as the selected center wavelength, a SAW of frequency $f_1$ previously set corresponding to this wavelength $\lambda_1$ is generated, and propagated along the optical waveguide 1 on the substrate S, to the SAW absorber 3A, so that, due to the acousto-optic effect by the SAW of this frequency $f_1$, only the optical signal of wavelength $\lambda_1$ out of the WDM signal light being propagated within the optical waveguide 1 is converted from the TE mode into the TM mode. The SAW generated in this mode coupling section A is set to have the sufficient intensity to mode convert all of the components of the optical signal of wavelength $\lambda_1$ (as shown in the aforementioned (C) of FIG. 17, the wavelength $\lambda_1$ has a slight spread with the wavelength $\lambda_1$ as the center). As a result, in the WDM signal light reached an output terminal of the mode coupling section A (P1 of FIG. 1), as shown in (B) of FIG. 2, only the optical signal of wavelength $\lambda_1$ is converted into the TM mode, and the optical signals of wavelengths $\lambda_2$ and $\lambda_3$ remain in the TE mode.

Then, the WDM signal light having passed through the mode coupling section A is input to the mode branching device 2A, and the TM mode optical signal, that is, here only the signal of wavelength $\lambda_1$, is branched to be sent to the wavelength characteristic flattening section B. At the wavelength characteristic flattening section B, a SAW of frequency $f_1$ set so that the intensity thereof is set to be sufficiently smaller compared to that of the SAW given to the mode coupling section A is generated, and propagated along the optical waveguide 1 on the substrate S to the SAW absorber 3B. Due to the acousto-optic effect by the SAW of this weak frequency $f_1$, a part of the optical signal of wavelength $\lambda_1$ being propagated within the optical waveguide 1 is converted from the TM mode into the TE mode. A ratio of light to be subjected to mode conversion in the wavelength characteristic flattening section B becomes greatest at the center wavelength $\lambda_1$ corresponding to the frequency $f_1$ of the SAW, and smaller the further away from the center wavelength $\lambda_1$. As a result, for the optical signal reached an output terminal of the wavelength characteristic flattening section B (P2 of FIG. 1), as shown in (C) of FIG. 2, the component of a part of the optical signal in the vicinity of the center wavelength $\lambda_1$ thereof is converted into the TE mode, and the other component remains as the TM mode. In the figure, the component corresponding to the TE mode is conceptually shown by the shaded portion.

Then, the optical signal having passed through the wavelength characteristic flattening section B is input to the mode branching device 2B, and only the optical component of TM mode is branched out of the optical signal, to be sent to the output port $1_{OUT}$. Consequently, the optical signal of wavelength $\lambda_1$ output from the output port $1_{OUT}$, as shown in (D) of FIG. 2, has the flattened light power with the TE mode component in the vicinity of the center wavelength $\lambda_1$ removed.

In this way, in the AOTF having the first basic configuration, by applying the weak intensity SAW of frequency $f_1$, in the wavelength characteristic flattening section B at the latter stage, to the optical signal of wavelength $\lambda_1$ selected by the previous stage mode coupling section A, it becomes possible to flatten the wavelength characteristic of the light power in the vicinity of the center wavelength $\lambda_1$. Furthermore, in the AOTF of this configuration, the width of the wavelength band to be flattened can be narrower than 1 nm. More specifically, it is also possible to make this a narrower band of, for example, 0.5 nm or less. Furthermore, since flattening of the filter characteristics is realized using the same acousto-optic effect, without newly adding a different type of optical element to the typical configuration AOTF, the manufacturing thereof is also simple. In addition, compared to the conventional system that achieves flattening of the filter characteristics by a functional approximation of the SAW to be given to the AOTF, the distance on which the SAW is propagated along the optical waveguide can be shortened. Therefore, a small size AOTF can be provided. Such an AOTF is effective, for example, as a wavelength branching element, a wavelength selection element, a wavelength rejection element, an optical add/drop element and the like in WDM optical communications. If an optical communication system is constructed using these, an effect that improves an incidence rate of line error can be expected.

Next is a description of a specific embodiment of an AOTF having the above-mentioned first basic configuration.

Figure 4:
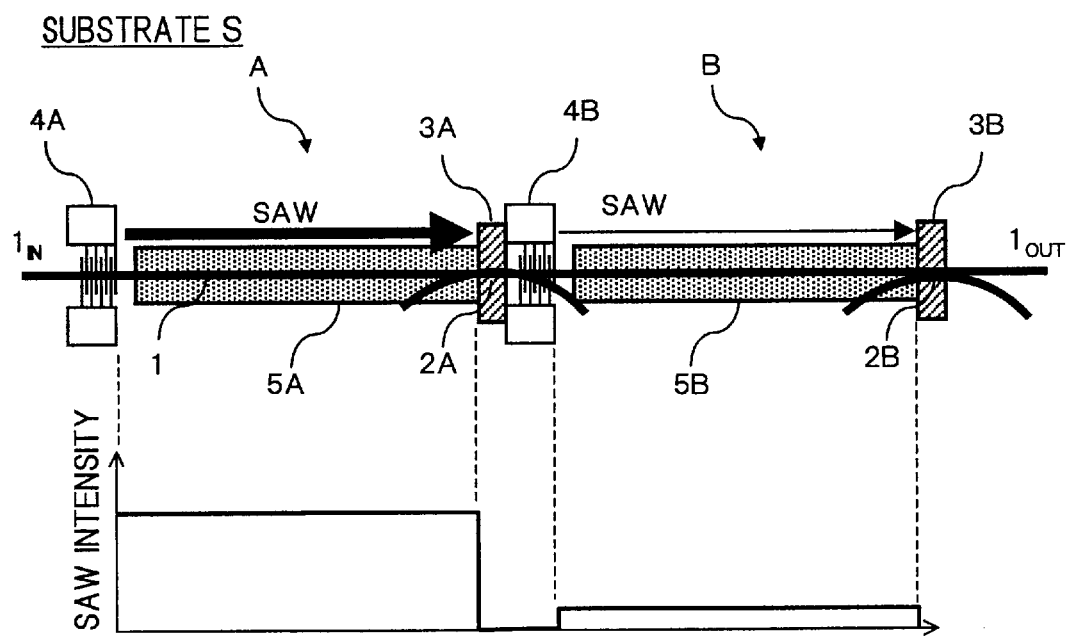
FIG. 4 is a plan view showing a configuration of an AOTF according to an embodiment 1-1 of the present invention.

FIG. 4 is a plan view showing a configuration of an AOTF according to an embodiment 1-1 of the present invention.

In FIG. 4, the AOTF of the embodiment 1-1 is configured such that the first basic configuration of the present invention is applied to an AOTF that uses thin film type SAW guides. Specifically, on an optical waveguide 1 formed on the substrate S, an interdigital transducer (hereunder IDT) 4A, an SAW guide 5A and an SAW absorber 3A, are respectively arranged as a mode coupling section A, and an IDT 4B, an SAW guide 5B, and an SAW absorber 3B are respectively arranged as a wavelength characteristic flattening section B. Moreover, a mode branching device 2A is inserted onto the optical waveguide 1 positioned between the SAW absorber 3A and the IDT 4B, and a mode branching device 2B is inserted onto the optical waveguide 1 positioned at the latter stage of the SAW absorber 3B.

The IDTs 4A and 4B are applied with RF signals of a required frequency generated by an RF signal generating circuit (not shown in the figure), to generate SAWs of frequencies corresponding to these RF signals, respectively. The RF signal to be applied to the IDT 4A is set so that the frequency thereof corresponds to the selected center wavelength, and the amplitude thereof corresponds to the intensity of a SAW capable of mode converting all of the optical signals of the selected center wavelength. The RF signal to be applied to the IDT 4B is set so that the frequency thereof corresponds to the selected center wavelength, and the amplitude thereof is sufficiently small compared to the amplitude of the RF signal to be applied to the IDT 4A. In a case where a plurality of selected center wavelengths are set, RF signals of a plurality of frequencies corresponding to the respective wavelengths can be applied to the IDTs 4A and 4B simultaneously.

The SAW guides 5A and 5B are thin films respectively formed on required areas on the substrate S surface, and are for propagating the respective SAWs generated by the IDTs 4A and 4B along the optical waveguide 1 to the respective SAW absorbers 3A and 3B. The respective SAW absorbers 3A and 3B are provided at ends positioned on opposite sides to the IDTs 4A and 4B of the respective SAW guides 5A and 5B, and almost completely absorb to terminate the SAWs propagated through the respective SAW guides 5A and 5B.

Here, for the mode coupling section A and the wavelength characteristic flattening section B, the configuration is such that, for example, the IDTs 4A and 4B are arranged on the input port $1_{IN}$ side, and the SAW guides 5A and 5B are provided so as to follow along the optical waveguide 1 from the IDTs 4A and 4B towards the respective SAW absorbers 3A and 3B, respectively, and each of the SAWs is propagated in the same direction as the propagation direction of the light inside the optical waveguide 1. The present invention is not limited to the above configuration and for example the arrangement of the IDTs and the SAW absorbers may be switched so that, for example, the SAWs given to the mode coupling section A and the wavelength characteristic flattening section B are propagated in a reverse direction to the light propagation direction. In this case, when the propagation directions of the SAWs relative to the light propagation direction are mutually different for the mode coupling section A and the wavelength characteristic flattening section B, it is necessary to consider an influence of frequency shift due to the so called Doppler effect. That is, at such a time, since the directions of frequency shift due to the Doppler effect are in the opposite directions to each other in the sections A and B, it is necessary to adjust the frequency of the RF signals applied to the IDTs 4A and 4B so as to correct a difference in the frequency shifts, so that the frequencies (wavelengths) of the optical signals to be subjected to mode conversion in the sections A and B are coincident with each other.

In the AOTF of the above-mentioned configuration, the TE mode (or the TM mode) WDM signal light input to the input port $1_{IN}$ is propagated through the optical waveguide 1, to be guided to the mode coupling section A in which the IDT 4A and the SAW guide 5A are positioned.

In the mode coupling section A, the SAW having been applied by the IDT 4A is propagated along the SAW guide 5A to the SAW absorber 3A, to interfere at the approximately constant intensity as shown at the bottom of FIG. 4, with the WDM signal light being propagated within the optical waveguide 1, so that only the optical signal of a wavelength corresponding to the frequency of the SAW is converted from the TE mode into the TM mode (or from the TM mode into the TE mode). Then, the WDM signal light having passed through the mode coupling section A is sent to the mode branching device 2A, and only the optical signal of a wavelength that has been subjected to mode conversion by the mode coupling section A is branched to be guided to the wavelength characteristic flattening section B in which the IDT 4B and the 5B are positioned.

In the wavelength characteristic flattening section B, the SAW having been applied by the IDT 4B is propagated along the SAW guide 5B to the SAW absorber 3B, to interfere at the approximately constant weak intensity as shown at the bottom of FIG. 4 with the optical signal being propagated within the optical waveguide 1, so that the component of a part of the optical signal in vicinity of the center wavelength thereof is converted from the TM mode into the TE mode (or from the TE mode into the TM mode). Then, the optical signal having passed through the wavelength characteristic flattening section B is sent to the mode branching device 2B, and only the optical component of TM mode (or TE mode) that has not been subjected to second mode conversion is branched, and an optical signal of which light power in the vicinity of the center wavelength has been flattened is output to the output port $1_{OUT}$.

In this manner, according to this embodiment 1-1, it is possible to realize an AOTF having filter characteristics of a narrow-band flattened relative to the selected center wavelength, and using a thin film type SAW guide which is easily manufactured and which can also be miniaturized.

Figure 5:
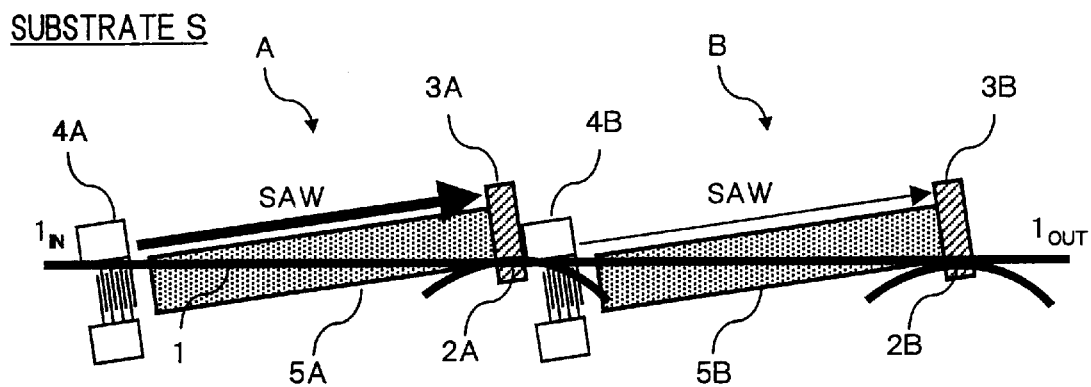
FIG. 5 is a plan view showing another configuration example related to the embodiment 1-1.

In the embodiment 1-1, the longitudinal direction of the SAW guides 5A and 5B is arranged so as to approximately coincide with the axial direction of the optical waveguide 1. However, for example, as shown in FIG. 5, the longitudinal direction of the SAW guides 5A and 5B may be set so as to be inclined by a required amount to the axial direction of the optical waveguide 1, and the propagation axes of the SAWs and the optical axis may be arranged so as to cross at an oblique angle. By adopting such an arrangement, then the intensity of the surface acoustic wave sensed by the light is weighted in the longitudinal direction. Thus, for the filter characteristics of the AOTF, it becomes possible to suppress the side lobe level.

Next is a description of another embodiment of an AOTF having the first basic configuration.

Figure 6:
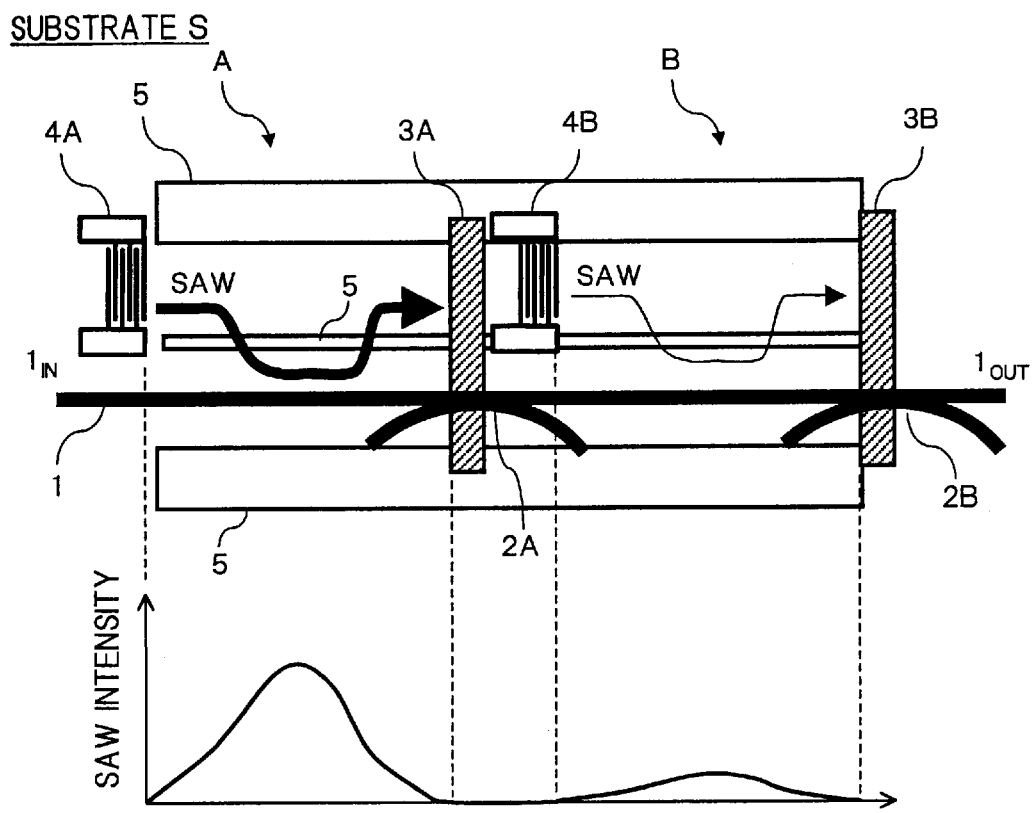
FIG. 6 is a plan view showing a configuration of an AOTF according to an embodiment 1-2 of the present invention.

FIG. 6 is a plan view showing a configuration of an AOTF according to an embodiment 1-2 of the present invention.

In FIG. 6, the AOTF of the embodiment 1-2 is configured such that the first basic configuration of the present invention is applied to an AOTF using a so-called directional coupling type SAW guide. Specifically, along an optical waveguide 1 formed on a substrate S, an IDT 4A and a SAW absorber 3A are arranged as a mode coupling section A, and an IDT 4B and a SAW absorber 3B are arranged as a wavelength characteristic flattening section B. Furthermore, SAW guides 5 of a required shape are arranged at predetermined positions so that SAWs generated by the IDTs 4A and 4B and propagated towards the SAW absorbers 3A and 3B, respectively, interfere (directionally couple) with the optical signal being propagated within the optical waveguide 1, in accordance with the intensity change such as shown at the bottom of FIG. 6. Moreover, a mode branching device 2A is inserted onto the optical waveguide 1 positioned between the SAW absorber 3A and the IDT 4B, and a mode branching device 2B is inserted onto the optical waveguide 1 positioned at the latter stage of the SAW absorber 3B.

At the top of FIG. 6, the paths of the SAWs propagated from the IDTs 4A and 4B towards the SAW absorbers 3A and 3B are conceptually shown using curved arrows, the thickness of the curved arrows representing the intensity of the SAWs. Furthermore, here also, the configuration is such that the SAWs are propagated in the same direction (forward direction) as the propagation direction of the light inside the optical waveguide 1. However, as with the aforementioned case of the embodiment 1-1, the positions of the IDT and the SAW absorber may be switched so that the SAW applied to the mode coupling section A or the wavelength characteristic flattening section B is propagated in the opposite direction to the propagation direction of the light. In this case also, it is necessary to consider the influence of frequency shift due to the Doppler effect.

In the AOTF of the above-mentioned configuration, as with the aforementioned case of the embodiment 1-1, the WDM signal light input to the input port $1_{IN}$ is guided to the mode coupling section A, and this WDM signal light and the SAW being propagated from the IDT 4A towards the SAW absorber 3A, are directionally coupled so that only the optical signal of a wavelength corresponding to the SAW frequency is mode converted. Then, the optical signal having been mode converted in the mode coupling section A is branched by the mode branching device 2A to be guided to the wavelength characteristic flattening section B. In the wavelength characteristic flattening section B, the optical signal being propagated within the optical waveguide 1 and the weak intensity SAW being propagated from the IDT 4B towards the SAW absorber 3B are directionally coupled, so that the component of a part of the optical signal in the vicinity of the center wavelength thereof is mode converted. Then, only the optical component that has not been subjected to second mode conversion is branched by the mode branching device 2B, and an optical signal of which light power in the vicinity of the center wavelength has been flattened is output to the output port $1_{OUT}$.

In this manner, according to this embodiment 1-2, it becomes possible to realize an AOTF having filter characteristics of a narrow-band flattened relative to the selected center wavelength, and which uses a directional coupling type SAW guide which is easily manufactured and which can also be miniaturized.

Next is a description of a second basic configuration of an AOTF according to the present invention.

Figure 7:
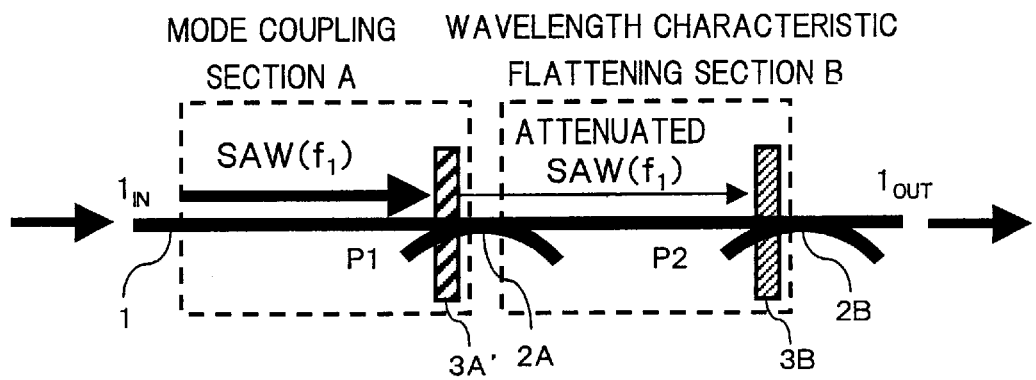
FIG. 7 is a plan view showing a second basic configuration of an AOTF according to the present invention.

FIG. 7 is a plan view showing the second basic configuration of the AOTF according to the present invention.

In FIG. 7, the second basic configuration AOTF is configured such that, in the above-mentioned first basic configuration shown in FIG. 1, instead of the SAW absorber 3A which absorbs completely all of the SAW being propagated the mode coupling section A, a SAW absorber 3A' with a reduced absorbance is used, and the weak intensity SAW attenuated by passing through this SAW absorber 3A' is propagated through the wavelength characteristic flattening section B to the SAW absorber 3B. In this second basic configuration, the configuration for generating the SAW of a frequency corresponding to the selected center wavelength may be provided only in the mode coupling section A, so that compared to the first basic configuration, the configuration of the wavelength characteristic flattening section B can be simplified.

In the AOTF having the second basic configuration, as with the operation for the case of the first basic configuration, the WDM signal light input to the input port $1_{IN}$ is propagated through the optical waveguide 1 to be guided to the mode coupling section A, and only the optical signal of a wavelength corresponding to the frequency of the SAW being propagated through the mode coupling section A is converted into a different polarization mode. Then, the optical signal having been subjected to mode conversion by the mode coupling section A is branched by the mode branching device 2A to be guided to the wavelength characteristic flattening section B.

In the wavelength characteristic flattening section B, the optical signal from the mode branching device 2A is interfered with the weak intensity SAW having passed through the SAW absorber 3A', to thereby mode convert the component of the part in the vicinity of the selected center wavelength. Then, only the optical component that has not been subjected to second mode conversion is branched by the mode branching device 2B, and an optical signal of which light power in the vicinity of the center wavelength has been flattened is output to the output port $1_{OUT}$.

Specifically, when the TE mode WDM signal light including, for example, the optical signals of wavelengths $\lambda_1$ to $\lambda_3$ as shown in (A) of FIG. 2 is input to the input port $1_{IN}$, the optical signals for the P1, the P2 and the output port $1_{OUT}$ inside the AOTF become the conditions respectively shown in (B), (C) and (D) of FIG. 2.

Also by means of the AOTF of this second basic configuration, the same effect as for the case of the AOTF of the first basic configuration can be obtained. Furthermore, in the wavelength characteristic flattening section B, since a configuration for generating a SAW of a frequency corresponding to the selected center wavelength need not be provided, it becomes possible to realize an AOTF of a simpler configuration.

Next is a description of a specific embodiment of an AOTF having the above-mentioned second basic configuration.

Figure 8:
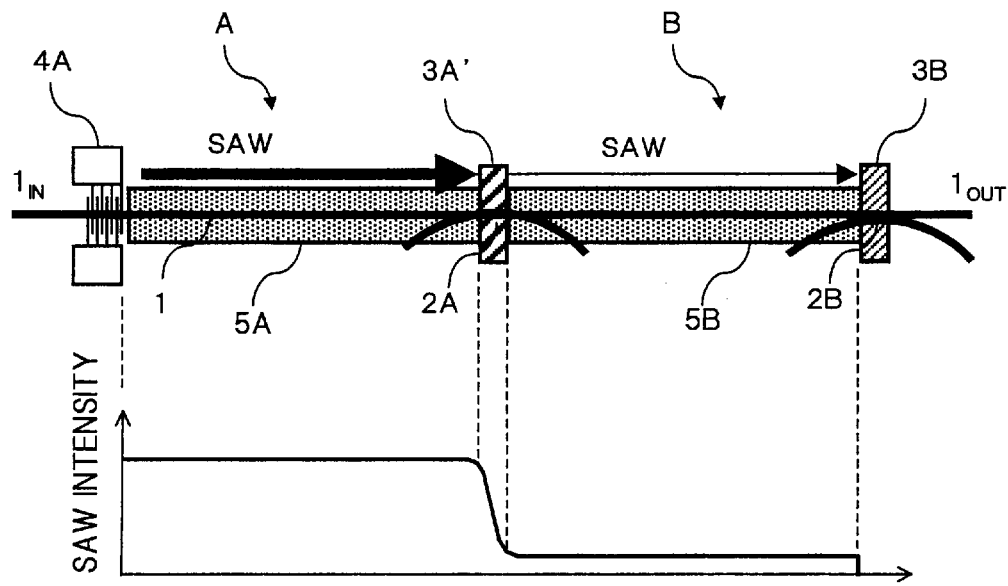
FIG. 8 is a plan view showing a configuration of an AOTF according to an embodiment 2-1 of the present invention.

FIG. 8 is a plan view showing a configuration of an AOTF according to an embodiment 2-1 of the present invention.

In FIG. 8, the AOTF of the embodiment 2-1 is configured such that the second basic configuration of the present invention is applied to an AOTF using a thin film type SAW guide, corresponding to a modification of the aforementioned AOTF of the embodiment 1-1 shown in FIG. 4. Specifically, the part where the configuration of this AOTF is different from the configuration of the embodiment 1-1 is that instead of the SAW absorber 3A of the mode coupling section A, a SAW absorber 3A' with reduced absorbance is used, and the IDT 4B of the wavelength characteristic flattening section B is omitted.

Furthermore, in the embodiment 1-1, the distance from the IDTs 4A and 4B to the respective SAW absorbers 3A and 3B is arranged so that the lengths of areas where the optical signal and the SAW interfere with each other (hereunder the interference length) become the same as each other in the mode coupling section A and the wavelength characteristic flattening section B. In the embodiment 2-1, with the omission of the IDT 4B, the position of the SAW absorber 3B is changed, so that the distance from the IDT 4A to the SAW absorber 3A' and the distance from the SAW absorber 3A' to the SAW absorber 3B become approximately the same.

In the AOTF of this configuration, the WDM signal light input to the input port $1_{IN}$ is propagated through the optical waveguide 1 to be guided to the mode coupling section A. In the mode coupling section A, the SAW having been applied by the IDT 4A is propagated along the SAW guide 5A to the SAW absorber 3A', and interferes at the approximately constant intensity as shown at the bottom of FIG. 8, with the WDM signal light being propagated within the optical waveguide 1, so that only the optical signal of a wavelength corresponding to the frequency of the SAW is mode converted. Then, the WDM signal light having passed through the mode coupling section A is sent to the mode branching device 2A, and only the optical signal of a wavelength that has been subjected to mode conversion by the mode coupling section A is branched, to be guided to the wavelength characteristic flattening section B.

The SAW from the IDT 4A, attenuated to the required intensity by passing through the SAW absorber 3A', is transmitted to the wavelength characteristic flattening section B, and this SAW is propagated along the SAW guide 5B to the SAW absorber 3B to interfere at the approximately constant weak intensity as shown at the bottom of FIG. 4, with the optical signal being propagated within the optical waveguide 1, so that the component of a part of the optical signal in the vicinity of the center wavelength thereof is mode converted. Then, for the optical signal that has passed through the wavelength characteristic flattening section B, only the optical component that has not been subjected to second mode conversion is branched by the mode branching device 2B, and an optical signal of which light power in the vicinity of the center wavelength has been flattened is output from the output port $1_{OUT}$.

In this manner, according to this embodiment 2-1, it becomes possible to realize an AOTF having filter characteristics of a narrow-band flattened relative to the selected center wavelength, and which uses a thin film type SAW guide which is easily manufactured and which can be further miniaturized due to the simplified construction, can be realized.

Next is a description of another embodiment of an AOTF having the second basic configuration.

Figure 9:
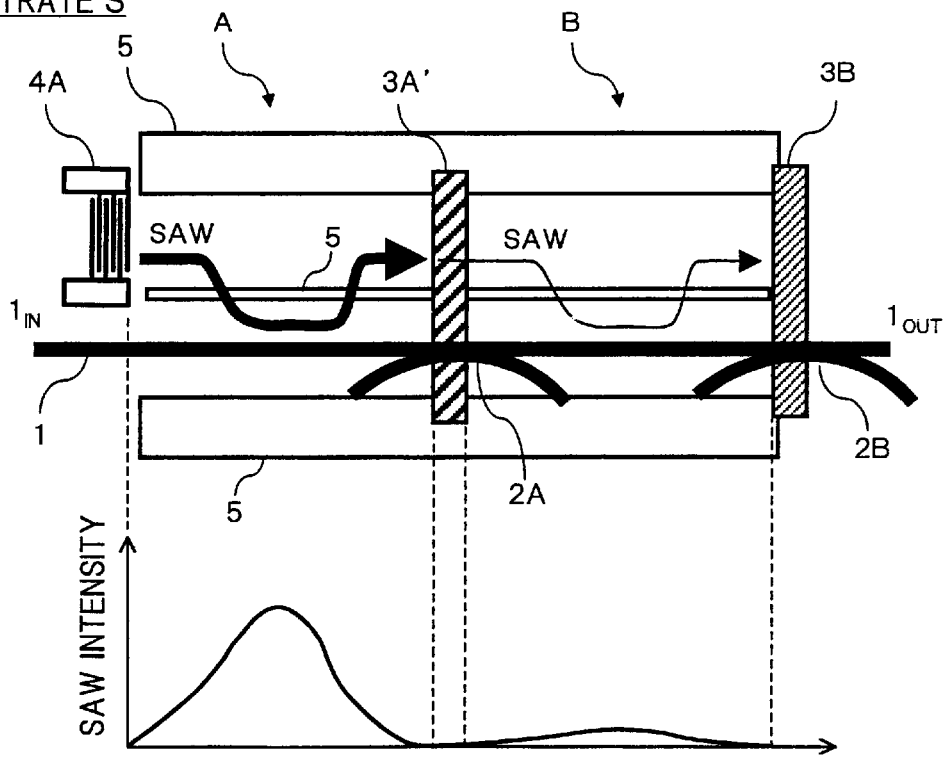
FIG. 9 is a plan view showing a configuration of an AOTF according to an embodiment 2-2 of the present invention.

FIG. 9 is a plan view showing a configuration of an AOTF according to an embodiment 2-2 of the present invention.

In FIG. 9, the AOTF of the embodiment 2-2 is configured such that the second basic configuration of the present invention is applied to an AOTF using a directional coupling type SAW guide, corresponding to a modification of the aforementioned AOTF of the embodiment 1-2 shown in FIG. 6. Specifically, the part where the configuration of this AOTF is different from the configuration of the embodiment 1-2 is that, instead of the SAW absorber 3A of the mode coupling section A, a SAW absorber 3A' with reduced absorbance is used, and the IDT 4B of the wavelength characteristic flattening section B is omitted. Furthermore, as with the aforementioned case of embodiment 2-1, with the omission of the IDT 4B, the position of the SAW absorber 3B is changed, so that the distance from the IDT 4A to the SAW absorber 3A' and the distance from the SAW absorber 3A' to the SAW absorber 3B become approximately the same.

In the AOTF of this configuration, the WDM signal light input to the input port $1_{IN}$ is guided to the mode coupling section A. In the mode coupling section A, the SAW applied by the IDT 4A is propagated along the SAW guide 5A to the SAW absorber 3A', and is directionally coupled according to the intensity change as shown at the bottom of FIG. 9, with the WDM signal light being propagated within the optical waveguide 1, so that only the optical signal of a wavelength corresponding to the frequency of the SAW is mode converted. Then, the WDM signal light that has passed through the mode coupling section A is sent to the mode branching device 2A, and only the optical signal of a wavelength that has been subjected to mode conversion by the mode coupling section A is branched to be guided to the wavelength characteristic flattening section B.

The SAW from the IDT 4A, attenuated to the required intensity by passing through the SAW absorber 3A' is transmitted to the wavelength characteristic flattening section B, and this weak SAW is propagated along the SAW guide 5B to the SAW absorber 3B, and is directionally coupled according to the intensity change as shown at the bottom of FIG. 9, with the optical signal being propagated within the optical waveguide 1, so that the component of a part of the optical signal in the vicinity center wavelength is mode converted. Then, only the optical component that has not been subjected to second mode conversion is branched by the mode branching device 2B, and an optical signal of which light power in the vicinity of the center wavelength has been flattened is output from the output port $1_{OUT}$.

In this manner, according to this embodiment 2-2, it becomes possible to realize an AOTF having filter characteristics of a narrow-band flattened relative to the selected center wavelength, and which uses a directional coupling type SAW guide which is easily manufactured and which can be further miniaturized due to the simplified construction.

Next is a description of a third basic configuration of an AOTF according to the present invention.

Figure 10:
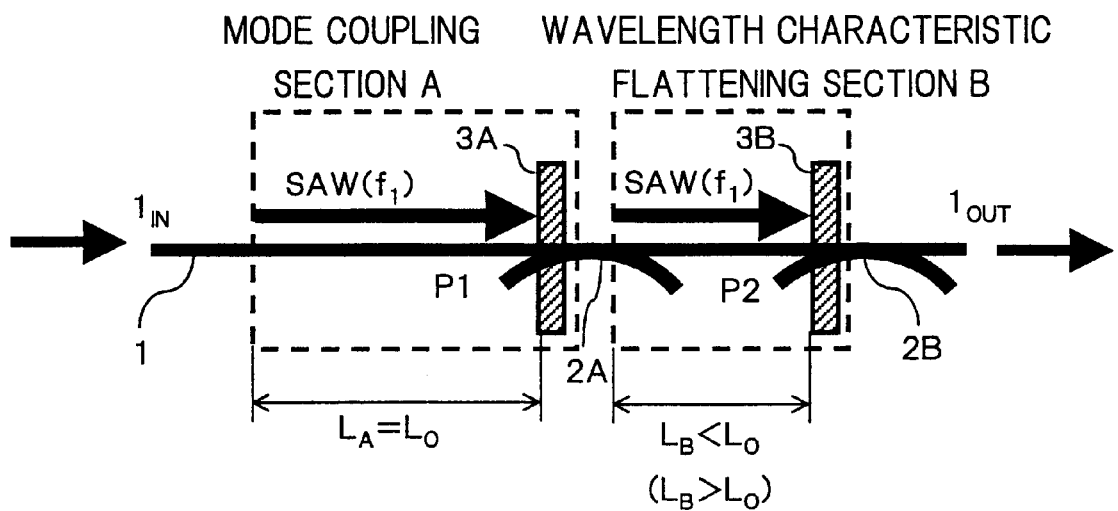
FIG. 10 is plan view showing a third basic configuration of an AOTF according to the present invention.

FIG. 10 is a plan view showing the third basic configuration of the AOTF according to the present invention.

In FIG. 10, the third basic configuration AOTF is configured such that, by shifting an interference length $L_B$ (the length of the area where the optical signal and the SAW interfere with each other) in the wavelength characteristic flattening section B from an optimum value $L_O$, then even if a SAW having the similar intensity to the SAW in the mode coupling section A is propagated through the wavelength characteristic flattening section B, flattening of the filter characteristics, similar to for the case of the first basic configuration can be realized. The optimum length $L_O$ of the interference length is an interference length where the optical signal of a wavelength corresponding to the frequency of the given SAW is completely converted from the TE mode into the TM mode (or from the TM mode into the TE mode).

In the configuration example of FIG. 10, the case is shown for where the interference length $L_B$ of the wavelength characteristic flattening section B is shorter than the optimum value $L_O$ ($L_B<L_O$). However, the present invention is not limited to this, and the configuration may be such that the interference length $L_B$ is longer than the value $L_O$ ($L_B>L_O$). However, the interference length $L_A$ in the mode coupling section A is set so as to coincide with the optimum value $L_O$.

In the AOTF having this third basic configuration, as with the operation for the case of the first basic configuration, the WDM signal light input to the input port $1_{IN}$ is propagated through the optical waveguide 1 to be guided to the mode coupling section A, and only the optical signal of a wavelength corresponding to the frequency of the SAW being propagated through the mode coupling section A set so that the interference length $L_A$ becomes the optimum length $L_O$, is all converted to a different polarization mode. Then, the optical signal that has been subjected to mode conversion by the mode coupling section A is branched by the mode branching device 2A, to be guided to the wavelength characteristic flattening section B.

In the wavelength characteristic flattening section B, since the interference length $L_B$ is set shifted from the optimum value $L_O$, then even if a SAW having the similar intensity to the SAW in the mode coupling section A is propagated, then for the optical signal of a wavelength corresponding to the frequency of that SAW, only the component of a part corresponding to the interference length $L_B$ is mode converted. The ratio of the light that is subjected to mode conversion in the wavelength characteristic flattening section B is greatest at the selected center wavelength, and smaller the further away from the selected center wavelength. Then, only the optical component that has not been subjected to second mode conversion in the wavelength characteristic flattening section B is branched by the mode branching device 2B, and an optical signal of which light power in the vicinity of the center wavelength has been flattened is output from the output port $1_{OUT}$.

Specifically, when the TE mode WDM signal light including, for example, the optical signals of wavelength $\lambda_1$ to $\lambda_3$ as shown in (A) of FIG. 2 is input to the input port $1_{IN}$, the optical signals for the P1, the P2, and the output port $1_{OUT}$ in the AOTF become the conditions respectively shown in (B), (C) and (D) of FIG. 2.

Also by means of the AOTF of this third basic configuration, the same effect as for the case of the AOTF of the first basic configuration can be obtained. Furthermore, since for both the mode coupling section A and the wavelength characteristic flattening section B, SAWs of the same frequency and the same intensity can be transmitted, then the adjustment operation for generating the required SAWs in the sections A and B becomes practically unnecessary, and hence an improvement in productivity due to the adjustment free can be also expected.

Next is a description of a specific embodiment of an AOTF having the above-mentioned third basic configuration.

Figure 11:
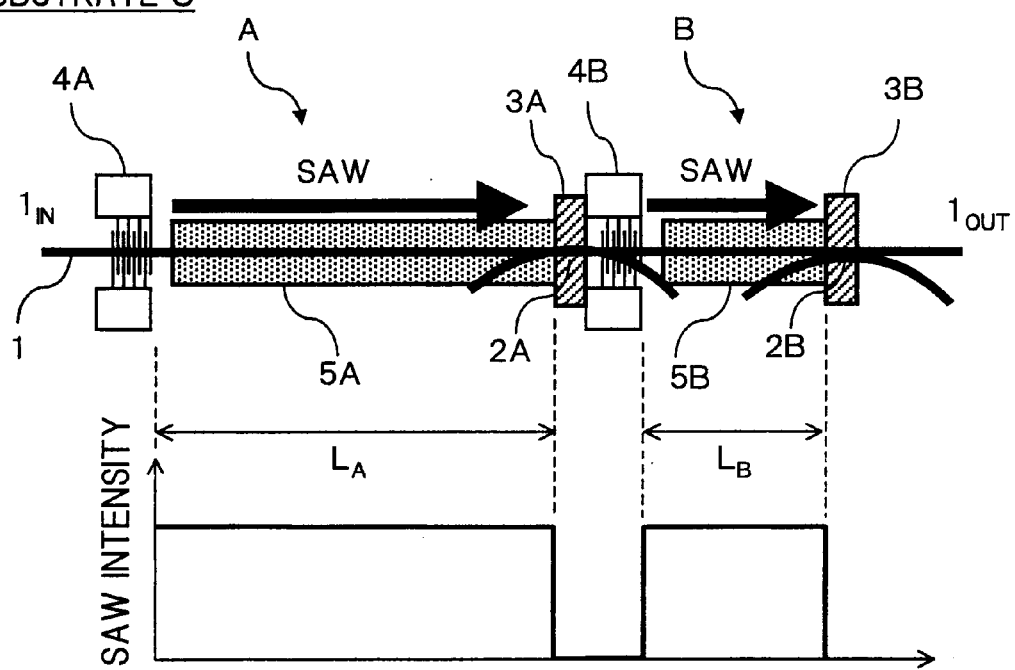
FIG. 11 is a plan view showing a configuration of an AOTF according to an embodiment 3-1 of the present invention.

FIG. 11 is a plan view showing a configuration of an AOTF according to an embodiment 3-1 of the present invention.

In FIG. 11, the AOTF of the embodiment 3-1 is configured such that the third basic configuration of the present invention is applied to an AOTF using a thin film type SAW guide, corresponding to a modification of the aforementioned AOTF of the embodiment 1-1 shown in FIG. 4. Specifically, the part where the configuration of this AOTF is different from the configuration of the embodiment 1-1 is that the SAW absorber 3B is brought closer to the IDT 4B, so that the interference length $L_B$ of the wavelength characteristic flattening section B is shorter than the optimum value $L_O$. Since the interference length $L_A$ of the mode coupling section A is coincided with the optimum value $L_O$, then here, interference length $L_B$<interference length $L_A$ is set. The interference length of the wavelength characteristic flattening section B may also be made longer than the optimum value $L_O$. In this case, interference length $L_B$>interference length $L_A$ is set.

In the AOTF of this configuration, the WDM signal light input to the input port $1_{IN}$ is propagated through the optical waveguide 1 to be guided to the mode coupling section A. In the mode coupling section A, the SAW that has been applied by the IDT 4A is propagated over the interference length $L_A$ along the SAW guide 5A to the SAW absorber 3A, and interferes at the approximately constant intensity as shown at the bottom of FIG. 11, with the WDM signal light being propagated within the optical waveguide 1, so that all of the components of the optical signal of a wavelength corresponding to the frequency of the SAW are mode converted. Then, the WDM signal light having passed through the mode coupling section A is sent to the mode branching device 2A, and only the optical signal of a wavelength that has been subjected to mode conversion by the mode coupling section A is branched, to be guided to the wavelength characteristic flattening section B.

In the wavelength characteristic flattening section B, a SAW having the similar intensity to that in the mode coupling section A is applied by the IDT 4B, and this SAW is propagated over the interference length $L_B$ along the SAW guide 5B to the SAW absorber 3B, to interfere at the approximately constant intensity as shown at the bottom of FIG. 11, with the optical signal being propagated within the optical waveguide 1, so that the component of a part of the optical signal in the vicinity of the center wavelength thereof is mode converted. Then, for the optical signal that has passed through the wavelength characteristic flattening section B, only the optical component that has not been subjected to second mode conversion is branched by the mode branching device 2B, and an optical signal of which light power in the vicinity of the center wavelength has been flattened is output from the output port $1_{OUT}$.

In this manner, according to this embodiment 3-1, it becomes possible to realize an AOTF having filter characteristics of a narrow-band flattened relative to the selected center wavelength, and which uses a thin film type SAW guide which is even more easily manufactured and which can also be miniaturized.

Next is a description of another embodiment of an AOTF having the third basic configuration.

Figure 12:
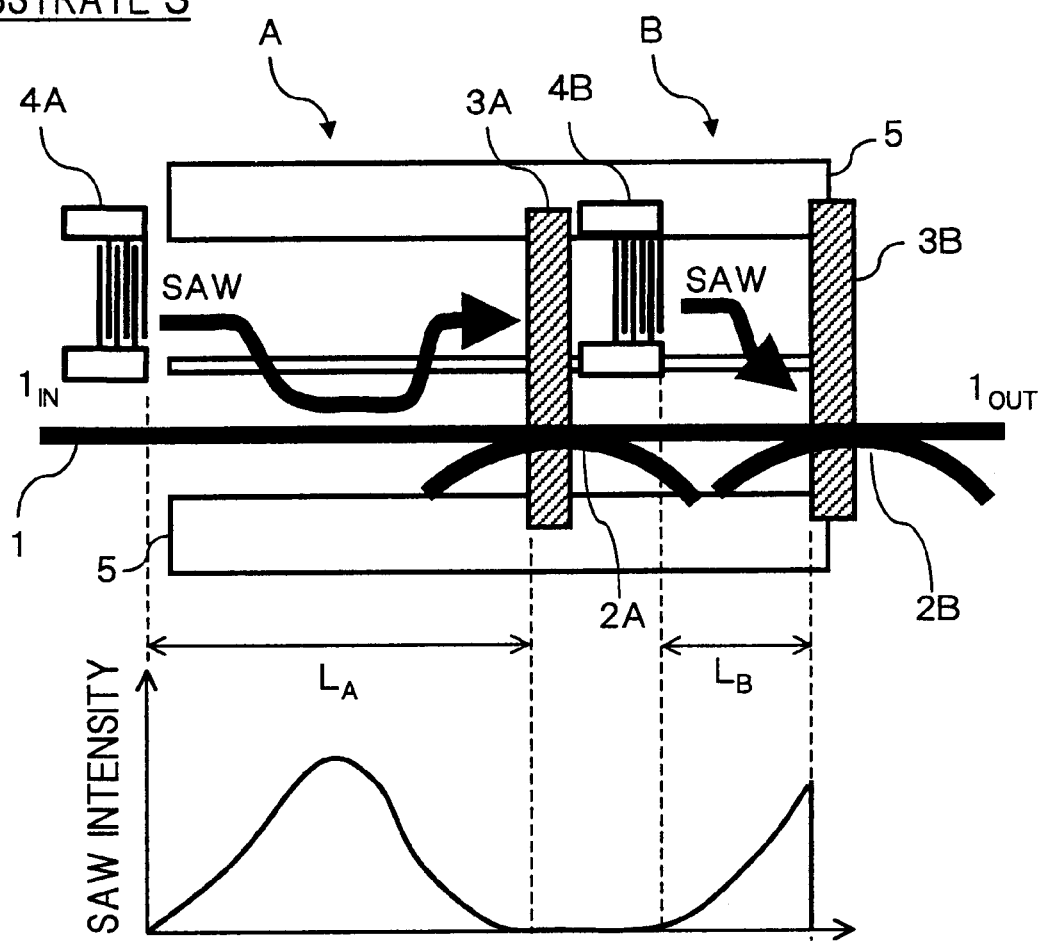
FIG. 12 is a plan view showing a configuration of an AOTF according to an embodiment 3-2 of the present invention.

FIG. 12 is a plan view showing a configuration of an AOTF according to an embodiment 3-2 of the present invention.

In FIG. 12, the AOTF of the embodiment 3-2 is configured such that the third basic configuration of the present invention is applied to an AOTF using a directional coupler type SAW guide, corresponding to a modification of the aforementioned AOTF of the embodiment 1-2 shown in FIG. 6. Specifically, the part where the configuration of this AOTF is different from the configuration of the embodiment 1-2 is that the SAW absorber 3B is brought closer to the IDT 4B, so that the interference length $L_B$ of the wavelength characteristic flattening section B is shorter than the optimum value $L_O$. Since the interference length $L_A$ of the mode coupling section A is coincided with the optimum value $L_O$, then here, interference length $L_B$<interference length $L_A$ is set. The interference length $L_B$ of the wavelength characteristic flattening section B may also be made longer than the optimum value $L_O$. In this case, interference length $L_B$>interference length $L_A$ is set.

In the AOTF of this configuration, the WDM signal light input to the input port $1_{IN}$ is propagated through the optical waveguide 1 to be guided to the mode coupling section A. In the mode coupling section A, the SAW that has been applied by the IDT 4A is propagated over the interference length $L_A$ along the SAW guide 5A to the SAW absorber 3A, and is directionally coupled according to the intensity change as shown at the bottom of FIG. 12, with the WDM signal light being propagated within the optical waveguide 1, so that all of the components of the optical signal of a wavelength corresponding to the frequency of the SAW are mode converted. Then, the WDM signal light having passed through the mode coupling section A is sent to the mode branching device 2A, and only the optical signal of a wavelength that has been subjected to mode conversion by the mode coupling section A is branched, to be guided to the wavelength characteristic flattening section B.

In the wavelength characteristic flattening section B, a SAW having the similar frequency and intensity to those of the SAW of the mode coupling section A is applied by the IDT 4B, and this SAW is propagated over the interference length $L_B$ along the SAW guide 5B to the SAW absorber 3B, and is directionally coupled according to the intensity change as shown at the bottom of FIG. 12, with the optical signal being propagated within the optical waveguide 1, so that the component of a part of the optical signal in the vicinity of the center wavelength is mode converted. Then, for the optical signal that has passed through the wavelength characteristic flattening section B, only the optical component that has not been subjected to second mode conversion is branched by the mode branching device 2B, and an optical signal of which light power in the vicinity of the center wavelength has been flattened is output from the output port $1_{OUT}$.

In this manner, according to this embodiment 3-2, it becomes possible to realize an AOTF having filter characteristics of a narrow-band flattened relative to the selected center wavelength, and which uses a directional coupler type SAW guide which is even more easily manufactured and which can also be miniaturized.

Next is a description of an application example for the case where the above-mentioned first through third basic configurations are applied to an AOTF having a so-called mode diversity type structure. Hereunder, the description is given for one example of a case where the first basic configuration is applied. Since cases where the second and third basic configurations are applied can be considered the same as for the case where the first basic configuration is applied, description thereof is here omitted.

Figure 13:
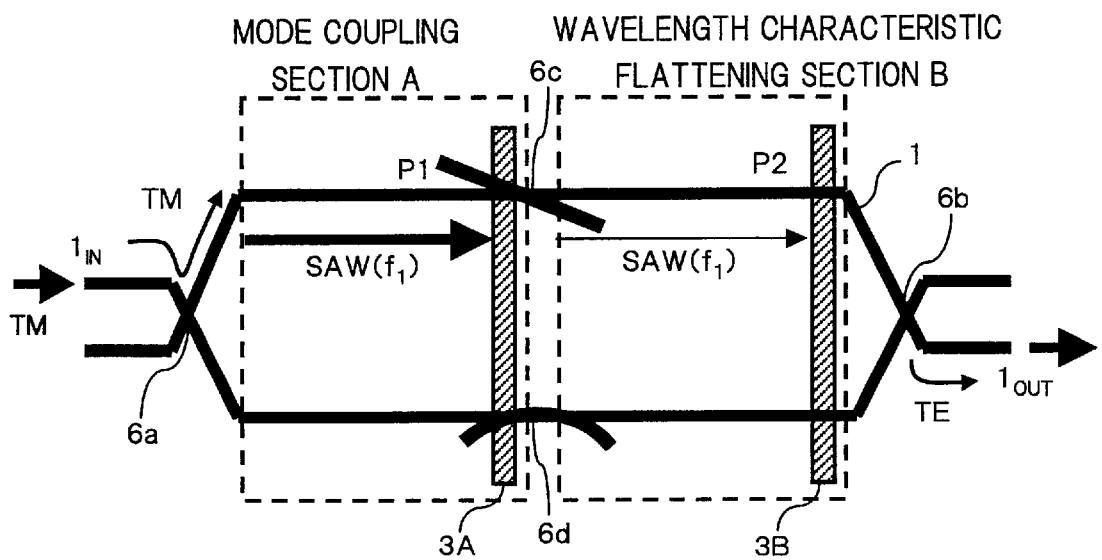
FIG. 13 is a plan view showing a configuration example of a mode diversity type AOTF to which the first basic configuration of the present invention is applied, illustrating a condition where a TM mode optical signal is input to an input port.
Figure 14:
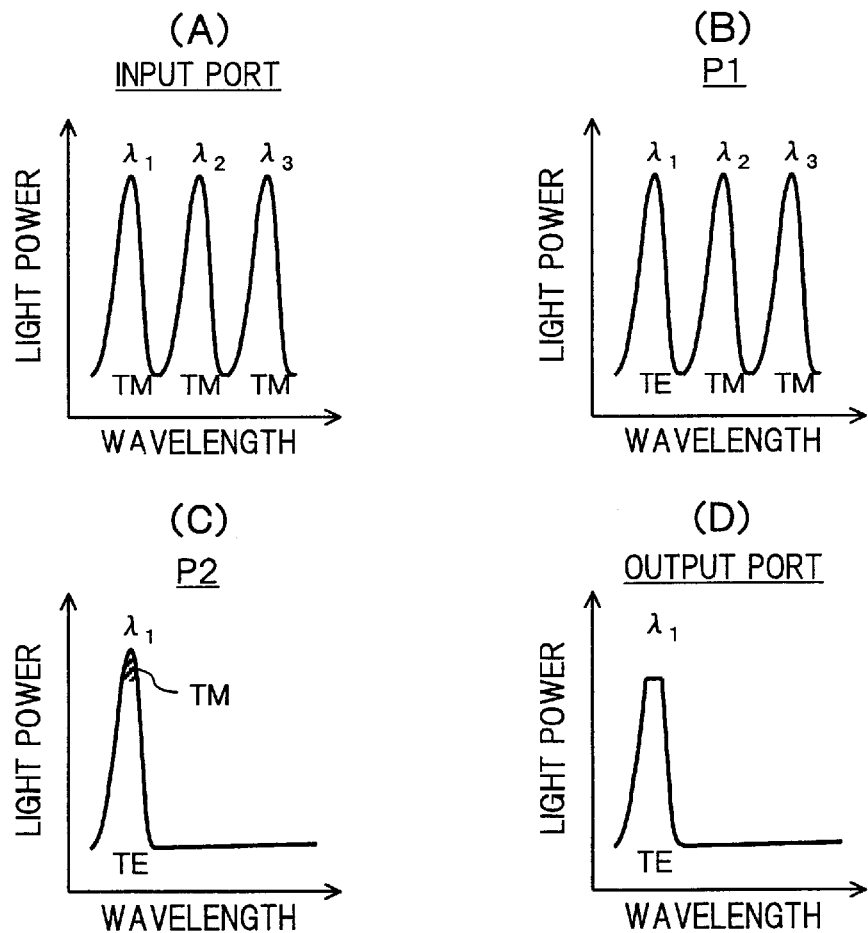
FIG. 14 is a diagram illustrating light powers and the polarization modes corresponding to wavelengths at respective points of the AOTF of FIG. 13.
Figure 15:
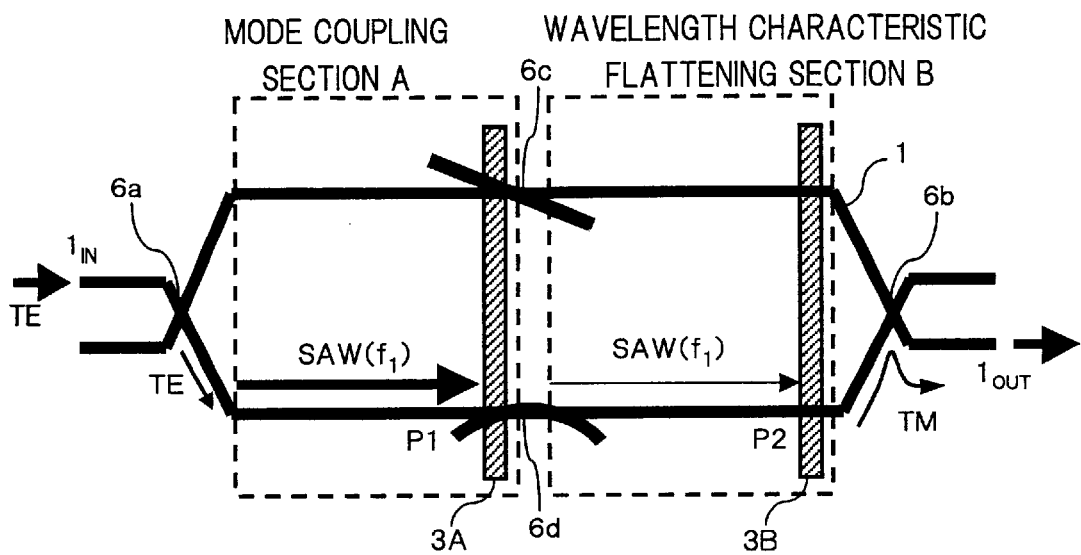
FIG. 15 is a plan view showing a configuration example of a mode diversity type AOTF to which the first basic configuration of the present invention is applied, illustrating a condition where a TE mode optical signal is input to the input port.
Figure 16:
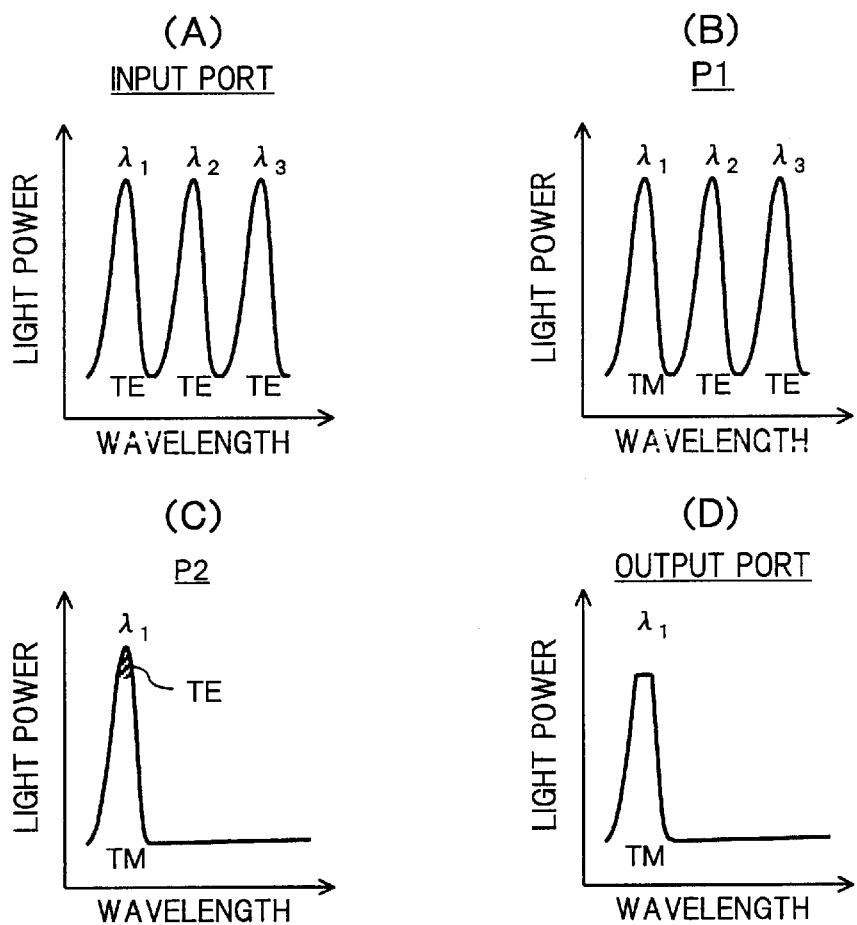
FIG. 16 is a diagram illustrating light powers and polarization modes corresponding to wavelengths at respective points of the AOTF of FIG. 15.

FIG. 13 and FIG. 15 are plan views showing a configuration example of a mode diversity type AOTF to which the first basic configuration is applied. In FIG. 13, the condition for a case where a TM mode optical signal is input to the input port is illustrated. In FIG. 15, the condition for a case where a TE mode optical signal is input to the input port is illustrated. Furthermore, FIG. 14 and FIG. 16 illustrate light powers and polarization modes corresponding to wavelengths at respective points of the AOTFs of FIG. 13 and FIG. 15.

In FIG. 13 and FIG. 15, this AOTF is configured such that mode branching devices 6a and 6b each having two input ports and two output ports, and optical waveguides 1 for respectively connecting between the output ports of the mode branching device 6a and the input ports of the mode branching device 6b are formed on a substrate S, and on these optical waveguides 1, there is arranged in sequence along the light propagation direction, a mode coupling section A and a wavelength characteristic flattening section B, and mode branching devices 6c and 6d are respectively inserted onto the optical waveguides 1 positioned between the mode coupling section A and the wavelength characteristic flattening section B.

As the mode branching devices 6a and 6b, for example, the aforementioned PBS such as shown in FIGS. 3A and 3B may be used. In the mode branching device 6a, one input port (for example, the upper input port in FIG. 13) is set for the input port $1_{IN}$ which receives the input of the WDM signal light, and a TM mode optical signal is output from the output port positioned on the same side (bar side) as this input port $1_{IN}$, and a TE mode optical signal is output from the output port positioned on a different side (crossing side) to this input port $1_{IN}$. In the mode branching device 6b, one output port (for example, the lower output port in FIG. 13) opposite to the position of the input port $1_{IN}$ is set for the output port for outputting the optical signal selected by the present AOTF.

At the mode coupling section A, the SAW having a frequency corresponding to the selected center wavelength is propagated along the optical waveguide 1 to the SAW absorber 3A. Specifically, as shown in FIG. 13, in a case where a TM mode optical signal is input to the input port $1_{IN}$ of the mode branching device 6a, the SAW is propagated along the optical waveguide 1 at the top of the figure, connected to the TM mode output port of the mode branching device 6a. Furthermore, as shown in FIG. 15, in a case where a TE mode optical signal is input to the input port $1_{IN}$ of the mode branching device 6a, the SAW is propagated along the optical waveguide 1 at the bottom of the figure, connected to the TE mode output port of the mode branching device 6a. Moreover, while not shown in the figure, in a case where both TM mode and TE mode optical signals are input to the input port $1_{IN}$ of the mode branching device 6a, similar SAWs are respectively propagated along the respective optical waveguides 1 connected to the respective output ports of the mode branching device 6a. The SAW absorber 3A has a characteristic where the respective SAWs having been propagated along the respective optical waveguides 1 are almost completely absorbed, and are essentially not conveyed to the latter stage.

At the wavelength characteristic flattening section B, a SAW having a frequency corresponding to the selected center wavelength and the intensity sufficiently smaller than the intensity of the SAW given by the mode coupling section A is propagated along the optical waveguide 1 to the SAW absorber 3B. Which of the optical waveguides the SAW is propagated is set in accordance with the polarization mode of the input light, similarly to the case of the mode coupling section A. The SAW absorber 3B almost completely absorbs the SAWs propagated along the respective optical waveguides 1.

The mode branching device 6c inserted onto the upper optical waveguide 1 connected to the TM mode output port of the mode branching device 6a, branches only the component of TE mode out of the optical signal having passed through the mode coupling section A, to send this to the wavelength characteristic flattening section B. Furthermore, the mode branching device 6d inserted onto the lower optical waveguide 1 connected to the TE mode output port of the mode branching device 6a, branches only the component of TM mode out of the optical signal having passed through the mode coupling section A and sends this to the wavelength characteristic flattening section B. Also, as the mode branching devices 6c and 6d, for example, the aforementioned PBS such as shown in FIGS. 3A and 3B may be used.

In the AOTF of the above-mentioned configuration, as shown in (A) of FIG. 14, in the case where the TM mode WDM signal light including the wavelengths $\lambda_1$ to $\lambda_3$ is input to the input port $1_{IN}$, this WDM signal light, as shown in FIG. 13, is propagated through the optical waveguide 1 connected to the output port positioned on the bar side of the mode branching device 6a to be guided to the mode coupling section A. In the mode coupling section A, for example, in the case where the wavelength $\lambda_1$ is set as the selected center wavelength, the SAW of frequency $f_1$ corresponding to this wavelength $\lambda_1$ is propagated along the optical waveguide 1 at the top of the figure to the SAW absorber 3A, so that only the optical signal of wavelength $\lambda_1$ is converted from the TM mode into the TE mode. As a result, for the WDM signal light reached the output terminal P1 of the mode coupling section A, as shown in (B) of FIG. 14, only the optical signal of wavelength $\lambda_1$ is converted into the TE mode, and the optical signals of wavelengths $\lambda_2$ and $\lambda_3$ remain in the TM mode. Then, for the WDM signal light having passed through the mode coupling section A, only the optical signal of wavelength $\lambda_1$ converted into the TE mode is branched by the mode branching device 6c, to be sent to the wavelength characteristic flattening section B.

In the wavelength characteristic flattening section B, a SAW of frequency $f_1$ set so that the intensity thereof is sufficiently smaller compared to that of the SAW given to the mode coupling section A is propagated along the optical waveguide 1 at the top of the figure to the SAW absorber 3B, and a part of the optical signal of wavelength $\lambda_1$ is converted from the TE mode into the TM mode. As a result, for the optical signal reached the output terminal P2 of the wavelength characteristic flattening section B, as shown in (C) of FIG. 14, the component of a part of the optical signal in the vicinity of the center wavelength $\lambda_1$ is converted into the TM mode, and the other component remains as the TE mode. Then, the optical signal having passed through the wavelength characteristic flattening section B is sent to one input terminal of the mode branching device 6b, and only the optical component of TE mode is output to the output port $1_{OUT}$ positioned on the crossing side to the input port. Consequently, the optical signal of wavelength $\lambda_1$ output from the output port $1_{OUT}$, as shown in (D) of FIG. 14, is flattened with the light power thereof in the vicinity of the center wavelength $\lambda_1$.

On the other hand, as shown in (A) of FIG. 16, in the case where the TE mode WDM signal light including optical signals of wavelengths $\lambda_1$ to $\lambda_3$ is input to the input port $1_{IN}$, the WDM signal light, as shown in FIG. 15, is propagated through the optical waveguide 1 connected to the output port positioned on the crossing side of the mode branching device 6a to be guided to the mode coupling section A. Then, in the mode coupling section A and the wavelength characteristic flattening section B, an operation is performed similar to the case where the aforementioned TE mode WDM signal light is input to the input port $1_{IN}$ (however, the relation of the TE/TM modes is switched), and the optical signals respectively reached the output end P1 of the mode coupling section A, the output end P2 of the wavelength characteristic flattening section B and the output port $1_{OUT}$ become the conditions as shown in (B), (C) and (D) of FIG. 16

In this manner, even though the first basic configuration is applied to the AOTF having a mode diversity type configuration, the above-mentioned effect of the present invention can be obtained. In particular, in the case where the optical signals of the TE/TM modes are input to the same input ports $1_{IN}$, and SAWs are respectively applied along the respective optical waveguides 1 through which the optical signals of each mode are propagated, it becomes possible to realize an AOTF independent of the polarization condition of the input light.

The application example for the above-mentioned mode diversity type can also be applied to an AOTF using a SAW guide of either a thin film type or a directional coupling type.

Furthermore, in the above-mentioned AOTF of the respective embodiments, the case is shown for where the mode coupling section A and the wavelength characteristic flattening section B are arranged on the same substrate S. However, the present invention is not limited to this, and the mode coupling section A and the wavelength characteristic flattening section B may be arranged on separate substrates, respectively. Furthermore, the configuration is shown for where a single mode coupling section A and a single wavelength characteristic flattening section B are provided, and in the case of setting a plurality of selected center wavelengths, it is described that a plurality of SAWs corresponding to the respective selected center wavelengths can be applied simultaneously to the sections A and B. However, of course a plurality of mode coupling sections and a plurality of wavelength characteristic flattening sections may be respectively provided corresponding to the respective selected center wavelengths.

What is claimed is:

1. An acousto-optic tunable filter in which a plurality of areas, each provided with an optical filter configuration capable of varying a selected wavelength, for performing selection of optical signals based on mode conversion using the acousto-optic effect, are respectively connected via a mode branching device,
    wherein at least one area of the plurality of areas functions as a mode coupling section that mode converts an optical signal corresponding to the selected wavelength,
    at least one of other areas functions as a wavelength characteristic flattening section that again mode converts only the optical component of a part of the selected optical signal mode converted by said mode coupling section in the vicinity of a center wavelength thereof, and
    said mode branching device connected to an output side of said wavelength characteristic flattening section, branches said selected optical signal except for the optical component mode converted by said wavelength characteristic flattening section, to output the branched selected optical signal, to thereby perform flattening of the wavelength characteristics in the vicinity of the center wavelength of the selected optical signal.

2. An acousto-optic tunable filter according to claim 1, wherein said mode coupling section propagates therethrough a surface acoustic wave having a frequency corresponding to the selected wavelength and having the intensity capable of mode converting the optical signal corresponding to said frequency, along an optical waveguide, and
    said wavelength characteristic flattening section propagates therethrough a surface acoustic wave having a frequency corresponding to the selected wavelength and having the intensity smaller than the intensity of the surface acoustic wave propagated within said mode coupling section, along the optical waveguide.

3. An acousto-optic tunable filter according to claim 2, wherein said mode coupling section and said wavelength characteristic flattening section each has an electrode that generates said surface acoustic wave by applying an electrical signal, a guide that propagates the surface acoustic wave from said electrode along the optical waveguide, and an absorber that absorbs to terminate the surface acoustic wave being propagated through said guide.

4. An acousto-optic tunable filter according to claim 2, wherein said mode coupling section has an electrode that generates said surface acoustic wave by applying an electrical signal, a guide that propagates the surface acoustic wave from the electrode along the optical waveguide, and an absorber that attenuates the surface acoustic wave being propagated through the guide and then transmit the attenuated surface acoustic wave to the wavelength characteristic flattening section, and
    said wavelength characteristic flattening section has a guide that propagates the attenuated surface acoustic wave transmitted from the absorber of said mode coupling section along the optical waveguide, and an absorber that absorbs to terminate the surface acoustic wave being propagated through said guide.

5. An acousto-optic tunable filter according to claim 1, wherein said mode coupling section propagates the surface acoustic wave having the frequency corresponding to the selected wavelength, along the optical waveguide over a predetermined interference length capable of mode converting the optical signal corresponding to the frequency, and
    said wavelength characteristic flattening section propagates the surface acoustic wave having the frequency corresponding to the selected wavelength, along the optical waveguide over an interference length different than said predetermined interference length.

6. An acousto-optic tunable filter according to claim 1, wherein said selected wavelength is set in plural wavelengths.

7. An acousto-optic tunable filter according to claim 6, wherein said mode coupling section and said wavelength characteristic flattening section are each given with a plurality of surface acoustic waves, each surface acoustic wave having a frequency corresponding to each of said selected wavelengths.

8. An acousto-optic tunable filter according to claim 6, wherein there is provided a plurality of said mode coupling sections and a plurality of said wavelength characteristic flattening sections corresponding to said plurality of selected wavelengths.

9. An acousto-optic tunable filter according to claim 1, wherein said plurality of areas have a thin film type surface acoustic wave guide arranged so as to overlap the optical waveguide.

10. An acousto-optic tunable filter according to claim 1, wherein said plurality of areas have a directional coupling type surface acoustic wave guide arranged so as to be parallel with the optical waveguide.

11. An acousto-optic tunable filter according to claim 1, wherein said plurality of areas are arranged on the same substrate.

12. An acousto-optic tunable filter according to claim 1, wherein said plurality of areas are arranged dividedly on a plurality of substrates.

13. An acousto-optic tunable filter according to claim 1, wherein said plurality of areas receives the input of an optical signal of one of a TE mode and a TM mode, and propagates said optical signal along a single optical waveguide.

14. An acousto-optic tunable filter according to claim 1, wherein said plurality of areas are capable of receiving the input of optical signals of a TE mode and a TM mode, and have a plurality of optical waveguides corresponding to respective modes, and propagates optical signals separated for each mode through said respective optical waveguides.

* * * * *